United States Patent
Vignoles et al.

(10) Patent No.: US 6,938,161 B2
(45) Date of Patent: Aug. 30, 2005

(54) TEST DRIVER SELECTION

(75) Inventors: James Malcolm Vignoles, Aylesbury (GB); Paul Nicholas Gartside, Milton Keynes (GB); Barrett Tuttle, Aylesbury (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 894 days.

(21) Appl. No.: 09/785,245

(22) Filed: Feb. 20, 2001

(65) Prior Publication Data

US 2002/0116621 A1 Aug. 22, 2002

(51) Int. Cl.[7] .................................. G06F 1/24
(52) U.S. Cl. .................. 713/188; 713/189; 713/193; 713/194; 713/200; 713/201
(58) Field of Search .................. 713/188, 189, 713/193, 194, 200, 201

(56) References Cited

U.S. PATENT DOCUMENTS

| | | |
|---|---|---|
| 5,502,815 A | 3/1996 | Cozza |
| 5,684,875 A | 11/1997 | Ellenberger |
| 5,948,104 A * | 9/1999 | Gluck et al. ............... 713/200 |
| 6,029,256 A | 2/2000 | Kouznetsov |

* cited by examiner

Primary Examiner—Thomas R. Peeso
(74) Attorney, Agent, or Firm—Nixon & Vanderhye P.C.; Christopher J. Hamaty

(57) ABSTRACT

A library of anti computer virus test drivers is provided with classifications for the drivers which may be used to select the applied drivers in dependence upon which anti computer virus program is using that library. The library is typically shared between a suite of anti computer virus programs. The drivers are also classified with information that allows them to be placed in a priority order for application when scanning. In this way, the drivers that protect against the most threatening viruses may be checked for first and accordingly the highest level of protection achieved if the scanning process is early terminated.

27 Claims, 3 Drawing Sheets

| FILE TYPE TO BE SCANNED | EMBEDDED HTML | MACRO | GENERAL | TROJANS/ WORMS | GRUNT |
|---|---|---|---|---|---|
| EXECUTABLE FILES | | | ✓ | ✓ | ✓ |
| DOCUMENTS | ✓ | ✓ | ✓ | ✓ | ✓ |
| E MAILS ATTACHMENT | | ✓ | ✓ | ✓ | ✓ |
| E MAIL BODIES | ✓ | | | | |

FIG. 2

PRIORITY ORDERING

NEWLY RELEASED

HIGHLY INFECTIOUS

HIGHLY DAMAGING

WIDE SPREAD

QUICK TO SCAN

GENERAL

RARE

SLOW TO SCAN

FIG. 3

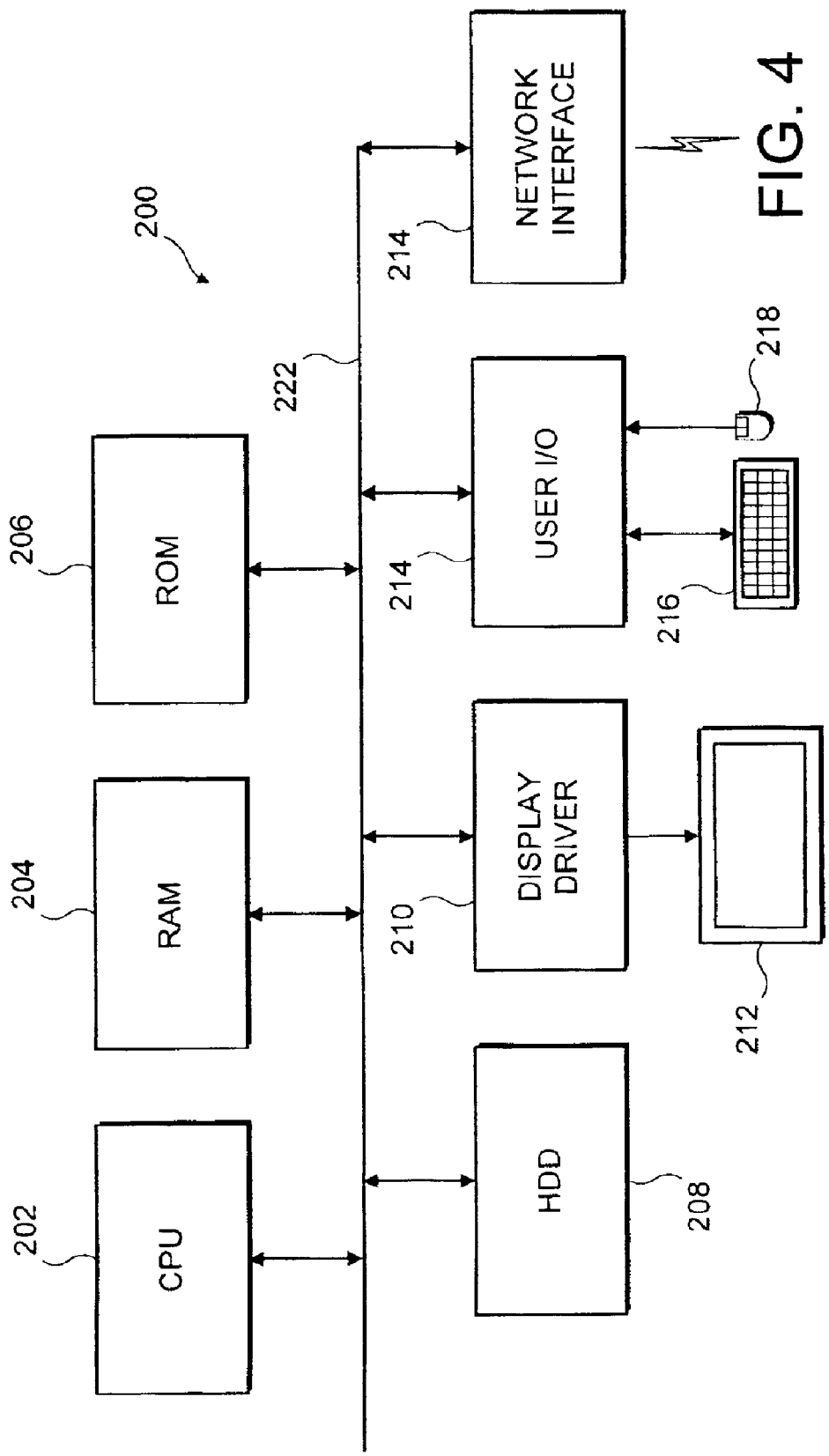

TEST DRIVER SELECTION

BACKGROUND OF THE INVENTION

1. Field of the Invention

This invention relates to the field of data processing systems. More particularly, this invention relates to data processing systems that apply a plurality of tests to a target computer file, such as, for example, a plurality of anti computer virus tests to scan a suspect computer file for computer viruses.

2. Background

It is known to provide anti computer virus programs that apply a plurality of tests to a suspect computer file to identify if it contains a computer virus. As new computer viruses are released, tests to detect those computer viruses are developed and added to the list of tests that an anti computer virus applies to a suspect computer file As the number of known computer viruses increases, then the number of tests required d also increases. Typical anti computer virus programs at the current time potentially apply tests for up to 60,000 different known computer viruses. The amount of computer processing resources required to perform these tests is large and ever-increasing.

There are various different types of computer virus. Some computer viruses infect only executable EXE and COM computer files, whereas other computer viruses may be macro viruses or embedded HTML viruses that only infect different file types. When a scanning engine receives a request to scan a particular computer file, then it is known to arrange that the scanning engine will select only those test drivers that check for computer viruses that could possibly infect that type of computer file, e.g. there is no point in checking an EXE file for an embedded Word macro virus.

Measures that can reduce the processing load associated with anti computer virus defence mechanisms and increase the efficiency and effectiveness of protection against computer viruses are strongly advantageous.

SUMMARY OF THE INVENTION

Viewed from one aspect, the present invention provides a computer program product comprising a computer program operable to control a computer to apply a plurality of tests to a target computer file, said computer program comprising:

(i) a test requestor operable to trigger one or more tests to be applied to said target computer file;

(ii) test data specifying a plurality of tests that may be applied to said target file, said test data being shared between a plurality of different test requesters;

(iii) test selecting logic operable to select which tests within said test data to apply to said target file in dependence upon which test requestor triggered said one or more tests to be applied to said target computer file.

As the sophistication of anti computer virus systems increases, there is an increase in the number of such different systems available. As an example, an individual provider of anti computer virus programs may provide programs that reside on a client computer, reside on a server computer, reside on an internet firewall, operate in conjunction with an e-mail server, or other possibilities. Whilst these different anti computer virus programs have different characteristics and provide different types of defence, they generally speaking are providing protection against the common pool of known computer viruses. Accordingly, to increase efficiency and speed of response to new threats, it is known that such different anti computer virus programs will share a common library of virus definitions/tests. In this way, when a new computer virus is released, a test and counter-measure may be more rapidly developed and added to the single library such that it may then be used by all of the different anti computer virus programs. Whilst this approach has strong advantages as mentioned above, it does suffer from some disadvantages. In particular, depending upon the anti computer virus program in question, only a small subset of the total contents of the library may in fact be applicable to that anti computer virus program. Burdening such an anti computer virus program with the need to access, manipulate and possibly apply the full library is a disadvantageous burden on processing resources that is addressed by the present invention in which the tests to be applied are selected in dependence upon the test requester. This differs from the prior art in which the test to be applied may be selected in dependence upon the target computer file type. With the technique of the present invention, a test requester which is designed and intended to protect against only a certain type of computer virus threat can be arranged to select only the relevant tests from the library leaving the job of protecting against other virus threats to the appropriate different portions of the overall system.

It will be appreciated that the technique of the invention is applicable outside of the particular context of anti computer virus protection, but is well suited to this particular application.

As examples of different types of test requestors within an anti computer virus system, there are e-mail body scanners, e-mail attachment scanners, on-access scanning agents, on-demand scanners, firewall scanners and network server scanners amongst other different types of programs. It may be that a particular test requester will only be intended to trigger testing for one or more particular computer file types and this can effectively be pre-selected upon the basis of the test requestor rather than being responsive to the computer file type.

Viewed from further aspects, the invention also provides a method of applying a plurality of tests to a target computer file and an apparatus for applying a plurality of tests to a target computer file.

BRIEF DESCRIPTION OF THE DRAWINGS

The above, and other objects, features and advantages of this invention will be apparent from the following detailed description of illustrative embodiments which is to be read in connection with the accompanying drawings, in which:

FIG. 2 is a diagram illustrating the relationship between a file type to be scanned by a particular anti computer virus program and the driver types used;

FIG. 3 illustrates a priority ordering in accordance with classifications associated with driver types; and FIG. 4 illustrates a general purpose computer architecture for carrying out the techniques described above.

DETAILED DESCRIPTION

Figure 1:
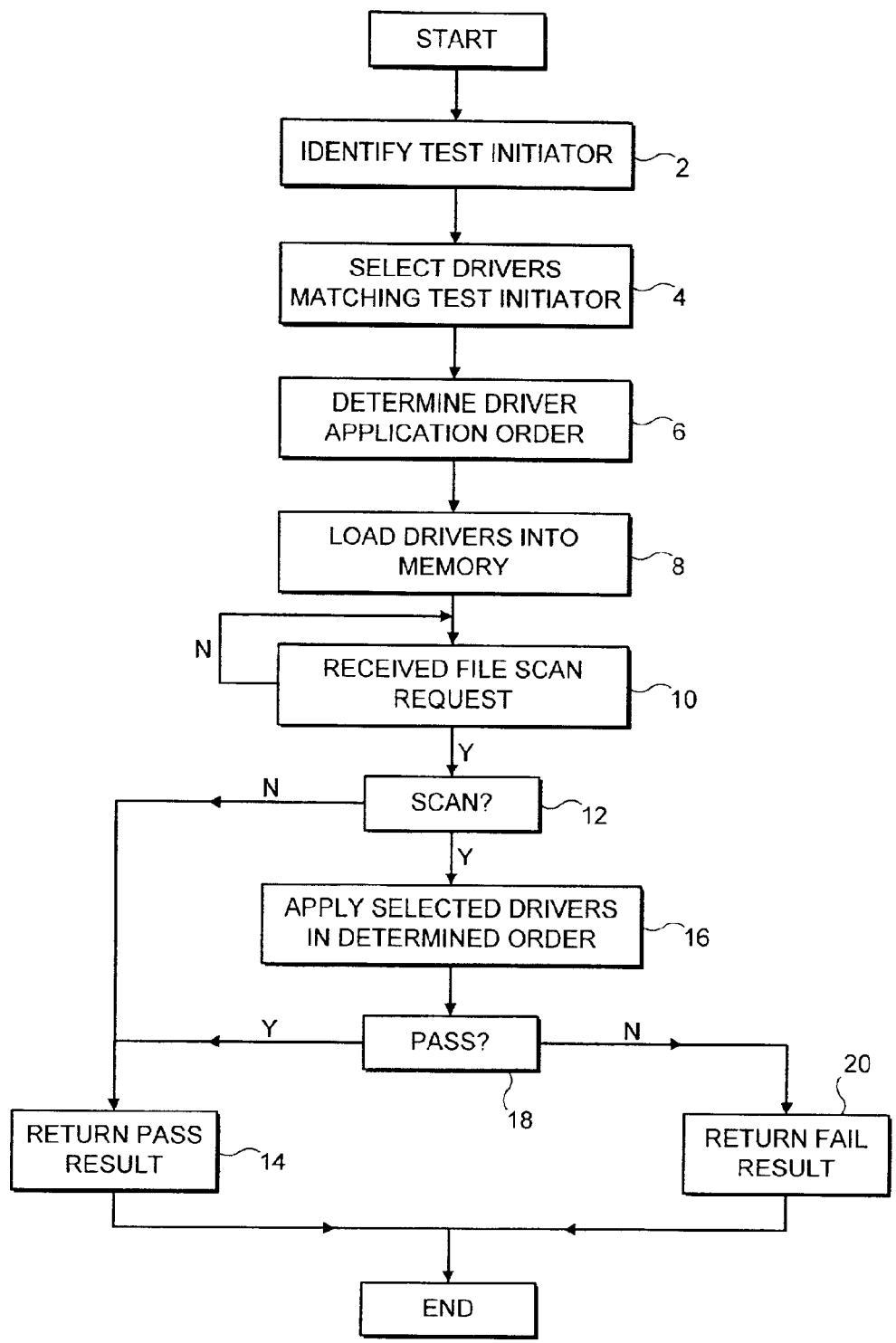
FIG. 1 is a flow diagram illustrating the operation of an anti-virus computer program.

FIG. 1 is a flow diagram illustrating the operation of an anti-virus computer program. At step 2, the identity of the test requestor/initiator is identified. In many cases, this step will be implicit as it will be built into a particular anti computer virus program which inherently will know its own identity. However, if generic code were written for this purpose, then the identifying test of step 2 would be required.

At step 4, the drivers matching the identity of the test initiator are selected from the library of anti computer virus test drivers stored within the system. The drivers have classification data associated with them indicating the computer file types to which they apply and the identity of different test initiators that will use them. The library of drivers may be viewed as a database and the selection a search and filtering operation through this database. The driver selection is made upon the basis of the identity of the test initiator rather than upon the file type of the target computer file.

At step 6, the priority order of the drivers selected at step 4 is established and the drivers are sorted into an order where the highest priority drivers will be applied first and the lowest priority drivers applied last.

At step 8, the selected and ordered drivers are loaded into random access memory from which they may be rapidly retrieved as opposed to being stored upon non-volatile storage media such as the hard disk drive of a system. At step 10, the program waits until it receives a scan request.

At step 12, when a scan request is received, a determination is made based upon the computer file type as to whether or not this particular test initiator is responsible for anti computer virus scanning for that file type. It may be that the target computer file needs processing, such as by unzipping or by searching for embedded further computer files before a determination can be made at step 12 as to whether or not to scan. The different test initiators may be different anti computer virus programs, such as an e-mail body scanner, an e-mail attachment scanner, an on-access scanning agent, an on-demand scanner, a firewall scanner or a network server scanner amongst other program types. As an example, an e-mail body scanner will typically only be responsible for scanning computer files to see if they contain any HTML embedded viruses. The responsibility for scanning e-mail attachments which may have a wide variety of file types and be subject to many more different potential virus threats is handled by other programs within the anti-virus computer system as a whole, such as an e-mail attachment scanner or a firewall scanner.

If the test at step 12 is that no scan is required, then processing proceeds to step 14 at which a pass result is returned to the scan requester.

If a scan is required, then processing proceeds to step 16 at which the selected and ordered drivers produced from steps 4 and 6 are applied in their priority order. During the scanning that takes place at step 16, an early terminate request can be received, for example by a user cancelling the scanning process or by an automatic time-out, but the priority ordering carried out at step 6 will have ensured that at least the highest threat viruses will have been scanned for.

At step 18, a test is made as to whether or not the scanning tests have been passed. If the tests have been passed, then processing proceeds to step 14 and a pass result is returned, whereas if the tests have not been passed then processing proceeds to step 20 and a fail result is returned.

FIG. 2 illustrates the relationship between different file types that a particular test initiator may be responsible for checking and the driver types that should be employed. The driver types include embedded HTML viruses, macro viruses, general viruses, trojans and worms, and grunt drivers (e.g. slow drivers that require the entire computer file to be tested, such as to provide protection against polymorphic viruses or the like). It will be seen from FIG. 2 that if a particular anti-virus computer program is only intended to provide protection against viruses contained within e-mail bodies, then only the embedded HTML drivers need to be applied. Conversely, if the anti computer virus product in question is intended to provide protection against viruses that may be carried by documents, then all of the different driver types should be selected for application by that anti computer virus program.

FIG. 3 illustrates example classifications that may be associated with drivers to assist in establishing a priority ordering for their application. These classifications typically relate to either the nature of the virus they protect against or the nature of the test itself. More than one classification may apply. The classifications include information regarding whether the driver relates to a newly released virus, a highly infectious virus, a highly damaging virus, a widespread virus, a quick-to-scan-for virus, a general average level threat virus, a rare virus, or a slow-to-scan-for virus. FIG. 3 represents an approximate priority ordering that could be applied. Particular anti-virus computer programs may alter the priority ordering shown in FIG. 3. As an example, the most highly infectious viruses, such as embedded e-mail macro viruses that can cause significant problems due to their rapid spread, may be checked for first within an e-mail scanning program as this is the primary frontline defence against such viruses. Conversely, in a network server scanning system, a greater threat may be from newly released viruses as these are more likely to be the ones received from outside the system and made their way on to the server through what were unprepared virus defences.

FIG. 4 schematically illustrates a computer 200 of a type that may be used to execute the computer programs described above. The computer 200 includes a central processing unit 202, a random access memory 204, a read-only memory 206, a hard disk drive 208, a display driver 210 and display 212, a user input/output circuit 214, a keyboard 216, a mouse 218 and a network interface circuit 220, all coupled via a common bus 222. In operation, the central processing unit 202 executes computer programs using the random access memory 204 as its working memory. The computer programs may be stored within the read-only memory 206, the hard disk drive 208 or retrieved via the network interface circuit 220 from a remote source. The computer 200 displays the results of its processing activity to the user via the display driver 210 and the display 212. The computer 200 receives control inputs from the user via the user input/output circuit 214, the keyboard 216 and the mouse 218.

The computer program product described above may take the form of a computer program stored within the computer system 200 on the hard disk drive 208, within the random access memory 204, within the read-only memory 206, or downloaded via the network interface circuit 220. The computer program product may also take the form of a recording medium such as a compact disk or floppy disk drive that may be used for distribution purposes. When operating under control of the above described computer program product, the various components of the computer 200 serve to provide the appropriate circuits and logic for carrying out the above described functions and acts. It will be appreciated that the computer 200 illustrated in FIG. 4 is merely one example of a type of computer that may execute the computer program product, method and provide the apparatus described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer program operable to control a computer to apply a plurality of tests to a target computer file, said computer program comprising:
   (i) a test requester operable to trigger one or more tests to be applied to said target computer file;
   (ii) test data specifying a plurality of tests that may be applied to said target file, said test data being shared between a plurality of different test requesters;
   (iii) test selecting logic operable to select which tests within said test data to apply to said target file in dependence upon which test requester triggered said one or more tests to be applied to said target computer file.

2. A computer program product as claimed in claim 1, wherein said test data specifies a plurality of anti computer virus tests.

3. A computer program product as claimed in claim 2, wherein said test data is a library of anti computer virus test drivers.

4. A computer program product as claimed in claim 3, wherein said plurality of different test requestors are a plurality of different anti computer virus programs that share a common library of anti computer virus test drivers.

5. A computer program product as claimed in claim 3, wherein said anti computer virus test drivers within said library have a classification relating to priority of use in testing said target computer file; and said anti computer virus test drivers are applied by said test engine in a priority order dependent upon classification whereby, if testing is terminated before completion, then the highest priority tests will have been applied.

6. A computer program product as claimed in claim 4, wherein said test selecting logic selects those anti computer virus test drivers within said library of anti computer virus test drivers that match whichever anti computer virus program triggered testing of said computer file.

7. A computer program product as claimed in claim 4, wherein said plurality of anti computer virus programs include at least one of:
   (i) an e-mail body scanner;
   (ii) an e-mail attachment scanner;
   (iii) an on-access scanning agent;
   (iv) an on-demand scanner;
   (v) a firewall scanner; and
   (vi) a network server scanner.

8. A computer program product as claimed in claim 7, wherein said test requestor is an e-mail body scanner and said test selecting logic selects anti computer virus drivers applicable to scanning for computer viruses embedded with e-mail bodies.

9. A computer program product as claimed in claim 1, wherein different tests are applicable to different computer file types, a particular test requester triggers testing for one or more particular computer file types, and said test selecting logic serves to select those tests applicable to said one or more particular computer file types.

10. A method of applying a plurality of tests to a target computer file, said method comprising the steps of:
    (i) in response to a test requester, triggering one or more tests to be applied to said target computer file using test data specifying a plurality of tests that may be applied to said target file, said test data being shared between a plurality of different test requesters; and
    (ii) selecting which tests within said test data to apply to said target file in dependence upon which test requester triggered said one or more tests to be applied to said target computer file.

11. A method as claimed in claim 10, wherein said test data specifies a plurality of anti computer virus tests.

12. A method as claimed in claim 11, wherein said test data is a library of anti computer virus test drivers.

13. A method as claimed in claim 12, wherein said plurality of different test requesters are a plurality of different anti computer virus programs that share a common library of anti computer virus test drivers.

14. A method as claimed in claim 12, wherein said anti computer virus test drivers within said library have a classification relating to priority of use in testing said target computer file; and said anti computer virus test drivers are applied by said test engine in a priority order dependent upon classification whereby, if testing is terminated before completion, then the highest priority tests will have been applied.

15. A method as claimed in claim 13, wherein said test selecting logic selects those anti computer virus test drivers within said library of anti computer virus test drivers that match whichever anti computer virus program triggered testing of said computer file.

16. A method as claimed in claim 13, wherein said plurality of anti computer virus programs include at least one of:
    (i) an e-mail body scanner;
    (ii) an e-mail attachment scanner;
    (iii) an on-access scanning agent;
    (iv) an on-demand scanner;
    (v) a firewall scanner; and
    (vi) a network server scanner.

17. A method as claimed in claim 16, wherein said test requester is an e-mail body scanner and said test selecting logic selects anti computer virus drivers applicable to scanning for computer viruses embedded with e-mail bodies.

18. Apparatus for applying a plurality of tests to a target computer file, said apparatus comprising:
    (i) processing circuits operable to serve as a test requester to trigger one or more tests to be applied to said target computer file;
    (ii) a memory operable to store test data specifying a plurality of tests that may be applied to said target file, said test data being shared between a plurality of different test requesters;
    (iii) a test selector operable to select which tests within said test data to apply to said target file in dependence upon which test requester triggered said one or more tests to be applied to said target computer file.

19. Apparatus as claimed in claim 18, wherein said test data specifies a plurality of anti computer virus tests.

20. Apparatus as claimed in claim 19, wherein said test data is a library of anti computer virus test drivers.

21. Apparatus as claimed in claim 20, wherein said anti computer virus test drivers within said library have a classification relating to priority of use in testing said target computer file; and said anti computer virus test drivers are applied by said test engine in a priority order dependent upon classification whereby, if testing is terminated before completion, then the highest priority tests will have been applied.

22. Apparatus as claimed in claim 20, wherein said plurality of different test requesters are a plurality of different anti computer virus programs that share a common library of anti computer virus test drivers.

23. Apparatus as claimed in claim 22, wherein said test selector selects those anti computer virus test drivers within said library of anti computer virus test drivers that match whichever anti computer virus program triggered testing of said computer file.

24. Apparatus as claimed in claim 22, wherein said plurality of anti computer virus programs include at least one of:
   (i) an e-mail body scanner;
   (ii) an e-mail attachment scanner;
   (iii) an on-access scanning agent;
   (iv) an on-demand scanner;
   (v) a firewall scanner; and
   (vi) a network server scanner.

25. Apparatus as claimed in claim 24, wherein said test requestor is an e-mail body scanner and said test selector selects anti computer virus drivers applicable to scanning for computer viruses embedded with e-mail bodies.

26. Apparatus as claimed in claim 18, wherein different tests are applicable to different computer file types, a particular test requestor triggers testing for one or more particular computer file types, and said test selecting logic serves to select those tests applicable to said one or more particular computer file types.

27. A method as claimed in claim 10, wherein different tests are applicable to different computer file types, a particular test requester triggers testing for one or more particular computer file types, and said test selecting logic serves to select those tests applicable to said one or more particular computer file types.

* * * * *

UNITED STATES PATENT AND TRADEMARK OFFICE
CERTIFICATE OF CORRECTION

PATENT NO. : 6,938,161 B2  Page 1 of 1
APPLICATION NO. : 09/785245
DATED : August 30, 2005
INVENTOR(S) : Vignoles et al.

It is certified that error appears in the above-identified patent and that said Letters Patent is hereby corrected as shown below:

col. 5, line 6 replace "requester" with --requestor--;
col. 5, line 10 replace "requesters" with --requestors--;
col. 5, line 13 replace "requester" with --requestor--;
col. 5, line 55 replace "requester" with --requestor--;
col. 5, line 61 replace "requester" with --requestor--;
col. 5, line 65 replace "requesters" with --requestors--;
col. 6, line 2 replace "requester" with --requestor--;
col. 6, line 10 replace "requesters" with --requestors--;
col. 6, line 36 replace "requester" with --requestor--;
col. 6, line 41 replace "requester" with --requestor--;
col. 6, line 47 replace "requesters" with --requestors--;
col. 6, line 50 replace "requester" with --requestor--;
col. 6, line 65 replace "requesters" with --requestors--;
col. 8, line 11 replace "requester" with --requestor--;

Signed and Sealed this

Second Day of February, 2010

David J. Kappos
*Director of the United States Patent and Trademark Office*